(12) United States Patent
Shafer

(10) Patent No.: US 8,941,471 B2
(45) Date of Patent: Jan. 27, 2015

(54) RF SWITCHED RFID MULTIPLEXER

(75) Inventor: Gary Mark Shafer, Charlotte, NC (US)

(73) Assignee: Tyco Fire & Security GmbH, Neuhausen am Reinfall (CH)

( * ) Notice: Subject to any disclaimer, the term of this patent is extended or adjusted under 35 U.S.C. 154(b) by 1223 days.

(21) Appl. No.: 12/223,769

(22) PCT Filed: Feb. 15, 2006

(86) PCT No.: PCT/US2006/005441
§ 371 (c)(1),
(2), (4) Date: Aug. 8, 2008

(87) PCT Pub. No.: WO2007/094787
PCT Pub. Date: Aug. 23, 2007

(65) Prior Publication Data
US 2009/0009296 A1    Jan. 8, 2009

(51) Int. Cl.
*H04Q 5/22*   (2006.01)
*G06K 7/00*   (2006.01)
*G06K 7/10*   (2006.01)

(52) U.S. Cl.
CPC .......... *G06K 7/0008* (2013.01); *G06K 7/10356* (2013.01)
USPC ..... 340/10.3; 340/10.1; 340/10.2; 340/10.31; 340/10.32; 340/10.33; 340/10.34; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385

(58) Field of Classification Search
USPC .......................... 340/10.1–10.6, 572.1–572.9; 235/375–385
See application file for complete search history.

(56) References Cited

U.S. PATENT DOCUMENTS

| | | | | |
|---|---|---|---|---|
| 3,670,252 A | * | 6/1972 | Rabow | 329/316 |
| 3,729,591 A | * | 4/1973 | Gueldenpfennig et al. | 340/2.21 |
| 3,959,745 A | * | 5/1976 | LaGuardia | 341/143 |
| 4,864,221 A | * | 9/1989 | Fouche et al. | 324/76.77 |
| 5,036,524 A | * | 7/1991 | Bergmans et al. | 375/230 |
| 5,448,242 A | * | 9/1995 | Sharpe et al. | 342/42 |
| 5,450,087 A | * | 9/1995 | Hurta et al. | 342/42 |
| 5,488,376 A | * | 1/1996 | Hurta et al. | 342/42 |
| 5,563,550 A | * | 10/1996 | Toth | 329/347 |
| 5,621,412 A | * | 4/1997 | Sharpe et al. | 340/10.33 |

(Continued)

FOREIGN PATENT DOCUMENTS

JP         04170284 A   *  6/1992   .......... H04N 7/167
WO   WO 0182213 A2  * 11/2001

*Primary Examiner* — George Bugg
*Assistant Examiner* — Paul Obiniyi
(74) *Attorney, Agent, or Firm* — Robert J. Sacco, Esq.; Fox Rothschild LLP

(57) ABSTRACT

A radiofrequency identification (RFID) multiplexer, which may be in a network, interprets an RF signal from an RFED reader as RFE) tag interrogation data. A single cable directs an RF signal from the RFID reader and RF control signals and/or RF power through the multiplexer. An RF sampler may be coupled to the cable; and an RF detector detects the RF signal from the cable via the RF sampler. A data decoder decodes and interprets the RF signal as the RFID tag interrogation data and forwards the RFID tag interrogation data to a control logic circuit as a MUX channel-change command. The logic circuit and decoder may be combined in a microcontroller, and an RF backscatter modulator coupled to the cable enables reverse communication with the RFID reader to determine whether another RFID multiplexer is coupled to the RFID multiplexer.

10 Claims, 6 Drawing Sheets

(56) References Cited

U.S. PATENT DOCUMENTS

| | | | |
|---|---|---|---|
| 5,668,715 A * | 9/1997 | Hong et al. | 363/131 |
| 5,686,920 A * | 11/1997 | Hurta et al. | 342/42 |
| 5,757,784 A * | 5/1998 | Liebowitz et al. | 370/321 |
| 5,771,021 A * | 6/1998 | Veghte et al. | 343/700 MS |
| 5,809,083 A * | 9/1998 | Wright | 375/285 |
| 5,953,745 A * | 9/1999 | Lattimore et al. | 711/162 |
| 6,064,320 A * | 5/2000 | d'Hont et al. | 340/933 |
| 6,076,132 A * | 6/2000 | Chen | 710/241 |
| 6,091,942 A * | 7/2000 | Buer et al. | 455/234.1 |
| 6,504,415 B1 * | 1/2003 | Robinson et al. | 327/291 |
| 6,621,467 B1 * | 9/2003 | Marsh | 343/850 |
| 6,633,592 B1 * | 10/2003 | Takahashi | 370/537 |
| 6,694,477 B1 * | 2/2004 | Lee | 714/784 |
| 6,903,656 B1 * | 6/2005 | Lee | 340/572.1 |
| 6,960,984 B1 * | 11/2005 | Vicci et al. | 340/10.1 |
| 7,049,933 B1 * | 5/2006 | Koerner | 340/10.1 |
| 7,058,312 B2 * | 6/2006 | Tong | 398/155 |
| 7,058,873 B2 * | 6/2006 | Song et al. | 714/752 |
| 7,092,470 B2 * | 8/2006 | Itou et al. | 375/369 |
| 7,209,527 B2 * | 4/2007 | Smith et al. | 375/341 |
| 7,253,717 B2 * | 8/2007 | Armstrong et al. | 340/10.2 |
| 7,278,071 B2 * | 10/2007 | Budde et al. | 714/708 |
| 7,310,390 B2 * | 12/2007 | Bertram | 375/340 |
| 7,317,379 B2 * | 1/2008 | Kimura | 340/10.51 |
| 7,340,013 B2 * | 3/2008 | Ammer et al. | 375/340 |
| 7,357,299 B2 * | 4/2008 | Frerking | 235/375 |
| 7,417,963 B2 * | 8/2008 | Chen et al. | 370/311 |
| 7,423,539 B2 * | 9/2008 | Hyde et al. | 340/572.4 |
| 7,424,209 B2 * | 9/2008 | Mazur | 386/330 |
| 7,448,547 B2 * | 11/2008 | Esterberg | 235/435 |
| 7,459,988 B1 * | 12/2008 | Iversen | 333/103 |
| 7,469,127 B2 * | 12/2008 | Takiguchi | 455/41.1 |
| 7,483,432 B2 * | 1/2009 | Nuss et al. | 370/395.3 |
| 7,495,568 B2 * | 2/2009 | Banerjee | 340/573.1 |
| 7,510,117 B2 * | 3/2009 | Esterberg | 235/435 |
| 7,548,153 B2 * | 6/2009 | Gravelle et al. | 340/10.3 |
| 7,583,179 B2 * | 9/2009 | Wu et al. | 340/10.1 |
| 7,586,416 B2 * | 9/2009 | Ariyoshi et al. | 340/572.7 |
| 7,592,898 B1 * | 9/2009 | Ovard et al. | 340/10.4 |
| 7,592,961 B2 * | 9/2009 | Thober et al. | 343/745 |
| 7,626,488 B2 * | 12/2009 | Armstrong et al. | 340/10.2 |
| 7,639,119 B2 * | 12/2009 | Carrender et al. | 340/10.42 |
| 7,675,412 B2 * | 3/2010 | Adra | 340/539.13 |
| 7,683,788 B2 * | 3/2010 | Turner | 340/572.2 |
| 7,689,195 B2 * | 3/2010 | Wu et al. | 455/336 |
| 7,773,945 B2 * | 8/2010 | Reynolds | 455/41.3 |
| 7,890,080 B2 * | 2/2011 | Wu et al. | 455/336 |
| 7,969,284 B2 * | 6/2011 | Ovard et al. | 340/10.4 |
| 7,982,586 B2 * | 7/2011 | Ovard et al. | 340/10.4 |
| 7,997,475 B2 * | 8/2011 | Macurek et al. | 235/375 |
| 8,152,053 B2 * | 4/2012 | Pietrzyk et al. | 235/375 |
| 8,432,258 B2 * | 4/2013 | Wilkinson et al. | 340/10.4 |
| 2002/0181041 A1 * | 12/2002 | Tong | 359/123 |
| 2003/0021346 A1 * | 1/2003 | Bixby et al. | 375/240.25 |
| 2003/0080862 A1 * | 5/2003 | Kranz | 340/442 |
| 2003/0104848 A1 * | 6/2003 | Brideglall | 455/574 |
| 2004/0005019 A1 * | 1/2004 | Smith et al. | 375/341 |
| 2004/0057469 A1 * | 3/2004 | Nuss et al. | 370/535 |
| 2004/0081259 A1 * | 4/2004 | Ammer et al. | 375/340 |
| 2004/0093549 A1 * | 5/2004 | Song et al. | 714/752 |
| 2004/0103028 A1 * | 5/2004 | Littman et al. | 705/14 |
| 2004/0171373 A1 * | 9/2004 | Suda et al. | 455/415 |
| 2005/0054408 A1 * | 3/2005 | Steil et al. | 463/11 |
| 2005/0099269 A1 * | 5/2005 | Diorio et al. | 340/10.51 |
| 2005/0198920 A1 * | 9/2005 | Nakagawa et al. | 53/64 |
| 2005/0219050 A1 * | 10/2005 | Martin | 340/572.1 |
| 2006/0006986 A1 * | 1/2006 | Gravelle et al. | 340/10.3 |
| 2006/0008014 A1 * | 1/2006 | Tamaki et al. | 375/260 |
| 2006/0017634 A1 * | 1/2006 | Meissner | 343/742 |
| 2006/0049918 A1 * | 3/2006 | Takiguchi | 340/10.4 |
| 2006/0076401 A1 * | 4/2006 | Frerking | 235/380 |
| 2006/0107307 A1 * | 5/2006 | Knox et al. | 726/2 |
| 2006/0109128 A1 * | 5/2006 | Barink et al. | 340/572.2 |
| 2006/0176153 A1 * | 8/2006 | Tang | 340/10.4 |
| 2006/0186995 A1 * | 8/2006 | Wu et al. | 340/10.1 |
| 2006/0238301 A1 * | 10/2006 | Wu et al. | 340/10.1 |
| 2006/0269291 A1 * | 11/2006 | Kagawa et al. | 398/140 |
| 2007/0013528 A1 * | 1/2007 | Kantrowitz et al. | 340/573.4 |
| 2007/0044094 A1 * | 2/2007 | Banerjee | 717/176 |
| 2007/0085920 A1 * | 4/2007 | Ying et al. | 348/308 |
| 2007/0091006 A1 * | 4/2007 | Thober et al. | 343/745 |
| 2007/0120682 A1 * | 5/2007 | Rea et al. | 340/572.8 |
| 2007/0140118 A1 * | 6/2007 | Cetin | 370/230 |
| 2007/0171992 A1 * | 7/2007 | Shameli et al. | 375/257 |
| 2007/0252698 A1 * | 11/2007 | Turner | 340/572.2 |
| 2008/0019468 A1 * | 1/2008 | Ammer et al. | 375/350 |
| 2008/0024279 A1 * | 1/2008 | Gravelle et al. | 340/10.3 |
| 2008/0069272 A1 * | 3/2008 | Bertram | 375/340 |
| 2008/0079564 A1 * | 4/2008 | Shafer et al. | 340/539.1 |
| 2008/0079582 A1 * | 4/2008 | Alexis et al. | 340/572.1 |
| 2008/0117051 A1 * | 5/2008 | Carrender et al. | 340/572.1 |
| 2008/0143485 A1 * | 6/2008 | Frerking | 340/10.1 |
| 2008/0204244 A1 * | 8/2008 | Carrender et al. | 340/572.1 |
| 2009/0058610 A1 * | 3/2009 | Krebs et al. | 340/10.1 |
| 2009/0209904 A1 * | 8/2009 | Peeters | 604/66 |
| 2010/0110894 A1 * | 5/2010 | Smith | 370/241 |
| 2010/0148929 A1 * | 6/2010 | Wu et al. | 340/10.1 |
| 2010/0208894 A1 * | 8/2010 | True et al. | 380/270 |

\* cited by examiner

RF SWITCHED RFID MULTIPLEXER

BACKGROUND

1. Technical Field

The present disclosure relates to a radiofrequency identification (RFID) network having an RFID multiplexer (MUX) with a single cable input port and which provides forward and/or reverse communication to the RFID network.

2. Background of Related Art

Certain applications of radiofrequency identification (REID) require a reader to connect to multiple antennas through a multiplexer (MUX). In this context, the MUX routs RFID signals, i.e., RF signals, to multiple antennas based on digital logic inputs from a controller. One example is a network including a shelf reader wherein RFID tagged merchandise is placed on shelves having multiple antennas all connected to a central reader. Such a network provides a long term inventory of items on the shelves. However, in such a network having multiple antennas, numerous wires and cables must be connected to the MUX in order to route the control, RF signals and alternating current/direct current (AC/DC) power necessary for network functionality.

SUMMARY

It is an object of the present disclosure to provide an RFID MUX, and a network which includes the RFID MUX, which is configured to interpret an RF signal from an RFID reader as RFID tag interrogation data and to forward the RFID tag interrogation data as a MUX channel-change command.

It is another object of the present disclosure to provide an RFID MUX, and a network which includes the RFID MUX, which enables reverse communication with an RFID reader to determine whether another RFID multiplexer is coupled to the RFID multiplexer.

It is still another object of the present disclosure to provide an RFID MUX configured to be coupled to an RFID reader, and a network which includes the RFID MUX and the RFID reader, wherein a single cable directs an RF signal from the RFID reader and directs RF control signals or RF power through the RFID multiplexer.

The present disclosure relates to a radiofrequency identification (RFID) multiplexer (MUX) configured to interpret an RF signal from an RFID reader as RFID tag interrogation data. The RFID multiplexer may further include a cable enabling the RF signal to be provided from the RFID reader; an RF sampler operatively coupled to the cable; and an RF detector operatively coupled to the RF sampler, with the RF detector detecting the RF signal from the cable via the RF sampler. Furthermore, the RFID multiplexer may further include a data decoder operatively coupled to the RF detector; and a control logic circuit operatively coupled to the data decoder, wherein the data decoder decodes and interprets the RF signal detected by the RF detector as the RFID tag interrogation data. The data decoder may forward the RFID tag interrogation data to the control logic circuit as a MUX channel-change command. In one embodiment, the control logic circuit and data decoder may be combined in a microcontroller, and the RFID multiplexer further includes an RF backscatter modulator operatively coupled to the microcontroller and to the RF sampler, with the RF backscatter modulator being coupled to the cable to enable reverse communication with the RFID reader. Additionally, the RF backscatter modulator may enable the RFID reader to determine whether another RFID multiplexer is coupled to the RFID multiplexer.

The present disclosure relates also to a radiofrequency identification (RFID) multiplexer which is configured to be coupled to an RFID reader and wherein a single cable directs an RF signal from the RFID reader and at least one of RF control signals and RF power through the RFID multiplexer. The multiplexer may be configured to be coupled to the REID reader via the single cable, and the RFID multiplexer may further include a plurality of RF output switches configured to provide a plurality of output channels, wherein the single cable directs the RF signal and at least one of RF control signals and RF power from the RFID reader through the output channels. The single cable may direct at least RF signal and RF power, and the RF power may be recovered from the RF signal via a power recovery circuit. Additionally, the power recovery circuit may include one of (a) an RF choke operatively coupled to the cable which recovers one of direct current (DC) voltage and alternating current (AC) voltage from the RF signal to direct the RF power through the multiplexer, and (b) an RF sampler operatively coupled to the cable and an RF detector operatively coupled to the RF sampler, wherein the RF sampler and the RF detector recover one of direct current (DC) voltage and alternating current (AC) voltage from the RF signal to direct the RF power through the multiplexer. The RFID multiplexer may be configured to be coupled to the RFID reader to receive and to transmit the RF signal via an RF signal input antenna coupled to the single cable and an RFID reader antenna coupled to the RFID reader.

The present disclosure relates also to a radiofrequency identification (RFID) network which includes an RFID multiplexer (MUX); and an RFID reader operatively coupled to the RFID multiplexer, wherein the RFID multiplexer is configured to interpret an RF signal from the RFID reader as RFID tag interrogation data. The RFID network may further include a cable enabling the RF signal to be provided from the RFID reader; an RF sampler operatively coupled to the cable; and an RF detector operatively coupled to the RF sampler, with the RF detector detecting the RF signal from the cable via the RF sampler. The RFID network may further include a data decoder operatively coupled to the RF detector; and a control logic circuit operatively coupled to the data decoder, wherein the data decoder decodes and interprets the RF signal detected by the RF detector as the RFID tag interrogation data. The data decoder may forward the REID tag interrogation data to the control logic circuit as a MUX channel-change command. The control logic circuit and data decoder may be combined in a microcontroller, and the RFID multiplexer may further include an RF backscatter modulator operatively coupled to the microcontroller and to the RF sampler, with the RF backscatter modulator being operatively coupled to the cable to enable reverse communication with the RFID reader. The RF backscatter modulator may enable the RFID reader to determine whether another RFID multiplexer is coupled to the RFID multiplexer.

The present disclosure relates also to an RFID network which includes an RFID reader; and an RFID multiplexer operatively coupled to the RFID reader wherein a single cable directs an RF signal from the RFID reader and at least one of RF control signals and RF power through the RFID multiplexer. The multiplexer may be configured to be coupled to the RFID reader via the single cable, and the RFID multiplexer further includes a plurality of RF output switches configured to provide a plurality of output channels, wherein the single cable directs the RF signal and at least one of RF control signals and RF power from the RFID reader through the output channels. The single cable may direct at least RF signal and RF power, and the RF power may be recovered from the RF signal via a power recovery circuit. The power recovery circuit may include one of (a) an RF choke operatively coupled to the cable which recovers one of direct current (DC) voltage and alternating current (AC) voltage from the RF signal to direct the RF power through the multiplexer, and (b) an RF sampler operatively coupled to the cable and an RF detector operatively coupled to the RF sampler, wherein the RF sampler and the RF detector recover one of direct current (DC) voltage and alternating current (AC) voltage from the RF signal to direct the RF power through the multiplexer. The RFID multiplexer may be operatively coupled to the RFID reader to receive and to transmit the RF signal via an RF signal input antenna operatively coupled to the single cable and an RFID reader antenna operatively coupled to the RFID reader.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Figure 1:
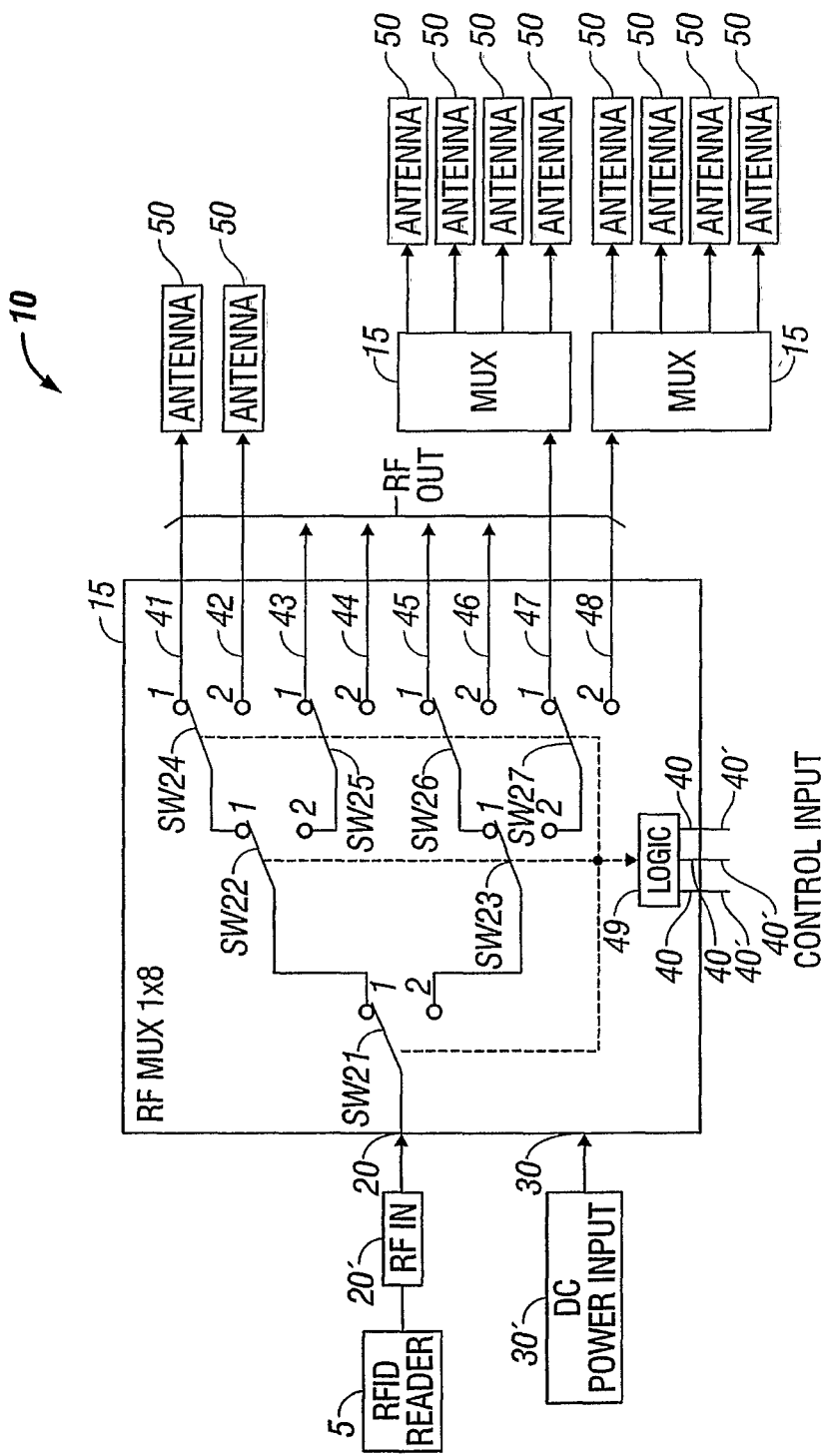
FIG. 1 is a schematic diagram of an RFID network having an RFID multiplexer with multiple cable input ports according to the prior art.

FIG. 1 shows one example of a prior art RF MUX network 10. More particularly, RF MUX network 10 includes an RF MUX 15. The RF MUX 15 has a multiplicity of switches which are illustrated by way of example as first tier switch SW21, second tier first and second switches SW22 and SW23, and third tier first through fourth switches SW24, SW25, SW26 and SW27. Each of the switches SW21 through SW27 has output contacts 1 and 2. Second tier switches SW22 and SW23 are connected in a cascade arrangement with respect to first tier switch SW21 via the contacts 1 or 2. Similarly, third tier first and second switches SW24 and SW25 are connected in a cascade arrangement with respect to second tier first switch SW22 via the contacts 1 or 2, while third tier third and fourth switches SW26 and SW27 are also connected in a cascade arrangement with respect to second tier second switch SW23 via contacts 1 or 2.

In one configuration, the third tier switches SW24 through SW27 provide alternating RF output to a multiplicity or plurality of MUX output channels 41 through 48 by alternating position between contacts 1 and 2 to a multiplicity of antennas 50. Alternatively, RF MUX 15 may be connected in cascade arrangement to additional RF multiplexers 15 through MUX output channels 41 through 48 alternating via contacts 1 or 2. The additional RF multiplexers 15, in turn, may also be connected to a multiplicity of antennas 50 through MUX output channels 41 through 48 alternating via contacts 1 or 2. In still another configuration, RF MUX 15 may be connected to provide RF output to at least one antenna 50 and to at least one additional MUX 15 also through MUX output channels 41 through 48 alternating via contacts 1 and 2. In the configuration illustrated in FIG. 1, the MUX 15 is classified as a 1×8 MUX since there is one RF input cable 20 which is multiplexed into eight contacts 1 and 2 associated with third tier switches SW24 to SW27.

Each of the RF MUX 15 further includes an RF signal input port 20 for an RF input cable 20', an AC or DC power input port 30 for a power input cable 30', and one or more control signal input ports 40 for one or more control signal input cables 40'. The control signal input cables 40' are coupled to a control logic circuit 49 which provides control signals to the switches SW21 through SW27 to implement a change channel (channels 41-48) command by alternating the positions of switches SW21 to SW27 between contacts 1 and 2. An RFID reader 5 may be coupled to the MUX 15 via the RF input cable 20'.

As a result, particularly in view of the potential cascade arrangements for the MUX 15, the RF MUX network 10 requires three separate cables 20', 30' and 40' to be connected to each MUX 15. Consequently, in some applications, numerous cables 20', 30' and 40' must be connected to enable RF MUX network 10 functionality.

Figure 2:
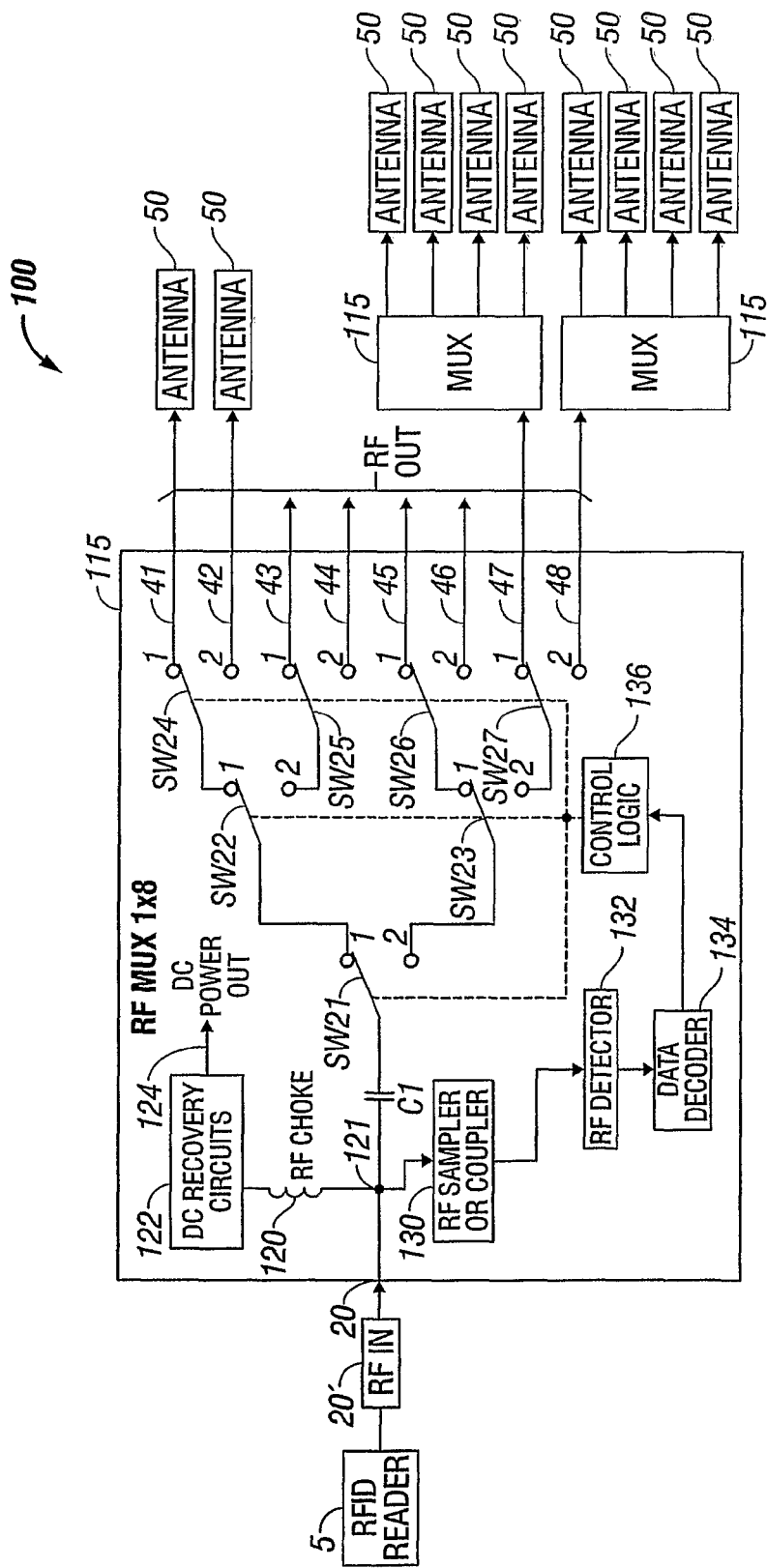
FIG. 2 is a schematic diagram of one embodiment of an RFID network having an RFID multiplexer with a single cable input port which provides forward communication through the RFID network according to the present disclosure.

FIG. 2 illustrates one embodiment of a RF MUX network 100 with an RF MUX 115 according to the present disclosure. More particularly, the RF MUX 115 includes the multiplicity or plurality of tier switches SW21 to SW27 connected in a 1×8 cascade arrangement with output contacts 1 and 2 as disclosed above with respect to RF MUX 15. However, in place of AC or DC power input port 30 and power input cable 30', an RF choke or low pass filter 120 may be operatively coupled to the RF input cable 20' at a junction point 121 between the RFID reader 5 and the switch SW21. In addition, a capacitor C1 may be operatively coupled between the junction point 121 and switch SW21. When an AC or DC voltage is injected through a decoupling network, (not shown) onto the cable 20', the RF choke 120 converts a portion of the RF signal directed through the RF input cable 20'. The capacitor C1 prevents the RF signal from being directed entirely to and from the switch SW21. In one embodiment, the RF input cable 20' is a coaxial type cable, although other cable types are envisioned and may be employed. The embodiments are not limited in this context.

The RF choke 120, in turn, is operatively coupled to power recovery circuits 122 which direct the recovered power as output power 124 to the MUX internal circuits (not shown). The RF choke 120 is particularly useful when only a limited number of MUX channels, such as channels 41 through 48, corresponding to switch contact positions 1 and 2 of switches such as tier switches SW21 through SW27, need to be powered.

In one embodiment, the RF MUX 115 further includes an RF sampler or coupler 130 operatively coupled to the coaxial cable 20' at junction point 121 and an RF detector 132 operatively coupled to the RF sampler 130. The RF detector 132 detects the RF signal from the coaxial cable 20' via the RF sampler 130. The MUX 115 may further include a data decoder 134 which is operatively coupled to the RF detector 132, and a control logic circuit 134 operatively coupled to the data decoder 134. The data decoder 134 decodes the RF signal detected by the RF detector 132 as RFID tag interrogation data. The control logic circuit 136 provides control signals to the tier switches SW21 to SW27 as change-channel commands to alternate contact between contacts 1 and 2, as necessary.

Consequently, the RF MUX 115 is configured to be coupled to RFID reader 5 in the network 100 such that a single cable 20' directs RF signal from the RFID reader 5 and the RF control signals and/or RF power through the MUX 115. The RF control signals are derived from the RFID reader 5.

In one embodiment, the third tier switches SW24 through SW27 of MUX 115 provide RF output alternating to the multiplicity of MUX output channels 41 through 48 via contacts 1 or 2 to a multiplicity of antennas 50. Alternatively, RF MUX 115 may be connected in cascade arrangement to additional RF multiplexers 115 through MUX output channels 41 through 48 by alternating the positions of switches SW21 to SW27 between contacts 1 and 2. The additional RF multiplexers 115 in turn may also be connected to a multiplicity of antennas 50 through MUX output channels 41 through 48 by alternating the positions of switches SW21 to SW27 between contacts 1 and 2. In still another embodiment, RF MUX 115 may be connected to provide RF output to at least one antenna 50 and to at least one additional MUX 115 also through MUX output channels 41 through 48 by alternating the positions of switches SW21 to SW27 between contacts 1 and 2. These embodiments are not limited in this context.

In the embodiment illustrated in FIG. 2, the MUX 15 is classified as a 1×8 MUX since there is one RF input cable 20' which is multiplexed into eight contacts 1 and 2 associated with third tier switches SW24 to SW27. Those skilled in the art will recognize that the embodiments of the present disclosure are not limited to a 1×8 cascade arrangement and that other cascade ratios may be provided. The embodiments are not limited in this context.

The RF detector 132 monitors the incoming RF signals as information through the RF sampler or coupler 130 and detects and decodes the information and interprets the information as RFID tag interrogation data being transmitted from the RFID reader 5. The MUX 115 is identified as an RFID tag by storage of an appropriate RFID tag identification number in the memory of the control logic 136. The RFID tag identification number of the MUX 115 is also stored in the software control memory for the RFID reader 5. The software control memory may reside in a separate computer or microprocessor (not shown) which controls the RFID reader 5. Therefore, the MUX 115 appears to the RFID reader 5 as an RFID tag. When a MUX output channel 41 through 48 needs to be changed, the RFID reader 5 issues a command as tag interrogation data directed to the MUX 115 in the same manner as if the MUX 115 were an RFID tag. When the MUX 115 decodes a channel-change command, the MUX 115 responds by changing to the appropriate command. If several of the MUXs 115 are connected in cascade, a MUX-select command can be issued by the RFID reader 5 to select the appropriate MUX 115.

The MUX channel control information is sent via the RF signal path 20' by modulating the control data onto the RF carrier from the RFID reader 5 in the same way as RFID data are modulated and distributed. In essence, the control data are formatted as an RFID tag interrogation command and transmitted through the cable 20' to the MUX 115 where the RFID tag interrogation command is received and decoded and interpreted as an RFID tag interrogation command. The RFID tag interrogation command may be transmitted as either an industry standard RFID protocol or as a special RFID tag interrogation command using a custom-designed RFID protocol. The embodiments are not limited in this context. The MUX 115 includes circuitry, e.g., the data decoder 134, enabling demodulation and recovery of the RFID data. The intended MUX channel setting 41 through 48 is then determined from the decoded data via the control logic 136.

Figure 3:
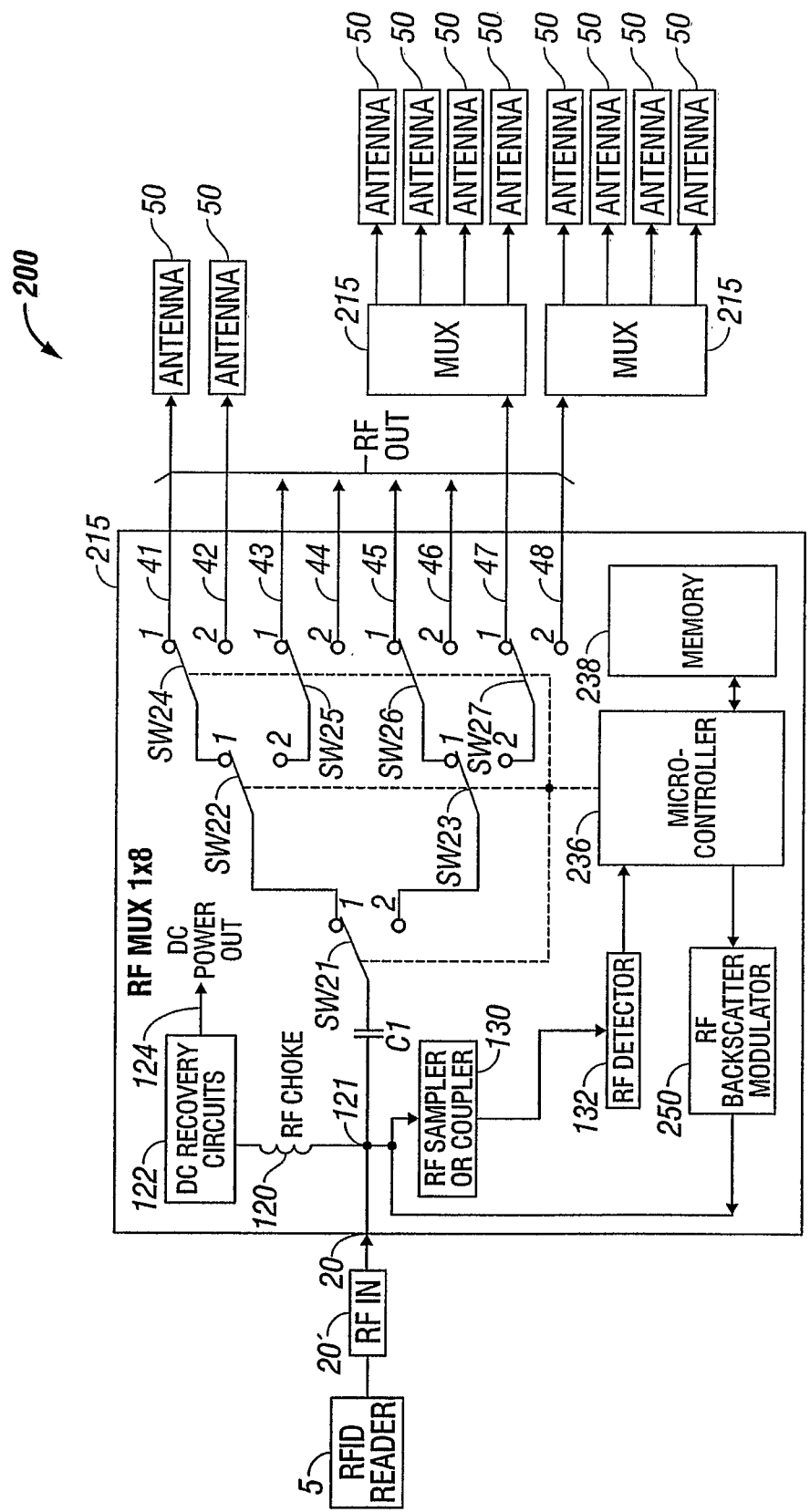
FIG. 3 is a schematic diagram of one embodiment of an RFID network having an RFID multiplexer with a single cable input port and which provides both forward and reverse communication through the RFID network according to the present disclosure.

FIG. 3 illustrates one embodiment of the present disclosure of a RF MUX network 200 which includes a RF MUX 215. More particularly, RF MUX 215 is identical to RF MUX 115 with the exception that the data decoder 134 and control logic circuitry 136 are combined in a microcontroller 236 which may further include a memory 238. In one embodiment, the microcontroller 236 is implemented on a computer platform having hardware such as one or more central processing units (CPU), a random access memory (RAM), a read only memory (ROM) and input/output (I/O) interface(s) such as a keyboard, a cursor control device (e.g., a mouse) and a display device. The RF detector 132 is operatively coupled to the microcontroller 236.

In a similar manner as applied to MUX 115, the MUX 215 is also identified as an RFID tag by storage of an appropriate RFID tag identification number in the memory 238 of the microcontroller 236. Again, the RFID tag identification number of the MUX 215 is also stored in the software control memory for the RFID reader 5. The software control memory may reside in a separate computer (not shown) for the RFID reader 5. Therefore, the MUX 215 appears to the RFID reader 5 as an RFID tag. Again, the control data are formatted as an RFID tag interrogation command and transmitted through the cable 20' to the MUX 215 where the RFID tag interrogation command is received and decoded and interpreted as an RFID tag interrogation command. The RFID tag interrogation command may be transmitted as either an industry standard RFID protocol or as a special RFID tag interrogation command using a custom-designed RFID protocol. The embodiments are not limited in this context.

In addition, the RF MUX 215 includes an RF backscatter modulator 250 which is operatively coupled to the microcontroller 236. The RF backscatter modulator 250 is operatively coupled also to the junction point 121 and therefore bypasses both the RF detector 132 and the RF sampler or coupler 130. Consequently, the RF backscatter modulator 250 is operatively coupled to the RFID reader 5 via the junction point 121 and the single cable 20'. As a result, the RF backscatter modulator 250 enables reverse communication to the RFID reader 5, so that the RF backscatter modulator 250 enables the RFID reader 5 to determine the status of the tier switches SW21 through SW27. Therefore, the RFID reader 5 may automatically determine when another MUX 215 has been added to the network 200. Since the RF detector 132 provides forward communication with all MUX 215 from the RFID reader 5, while the RF backscatter modulator 250 provides reverse communication from the MUX 215 to the RFID reader 5, the forward and reverse communication with all MUX 215 on the network 200 also enables global or individual configuration changes to the output channels 41 through 48, as required.

Figure 4:
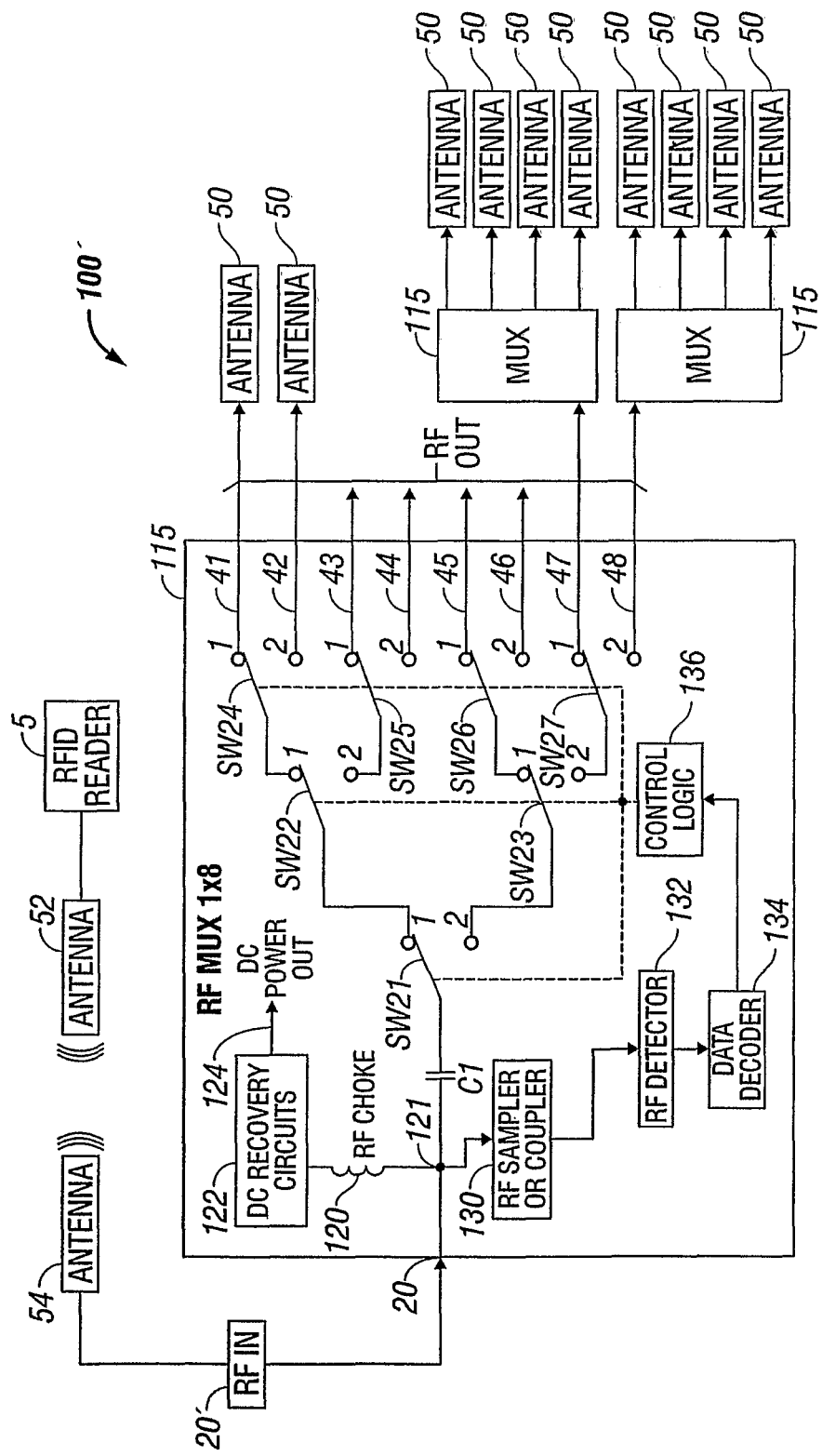
FIG. 4 is a schematic diagram of an alternate embodiment of the RFID network of FIG. 2 having an RFID multiplexer with a single cable input port which provides forward communication through the RFID network according to the present disclosure.
Figure 5:
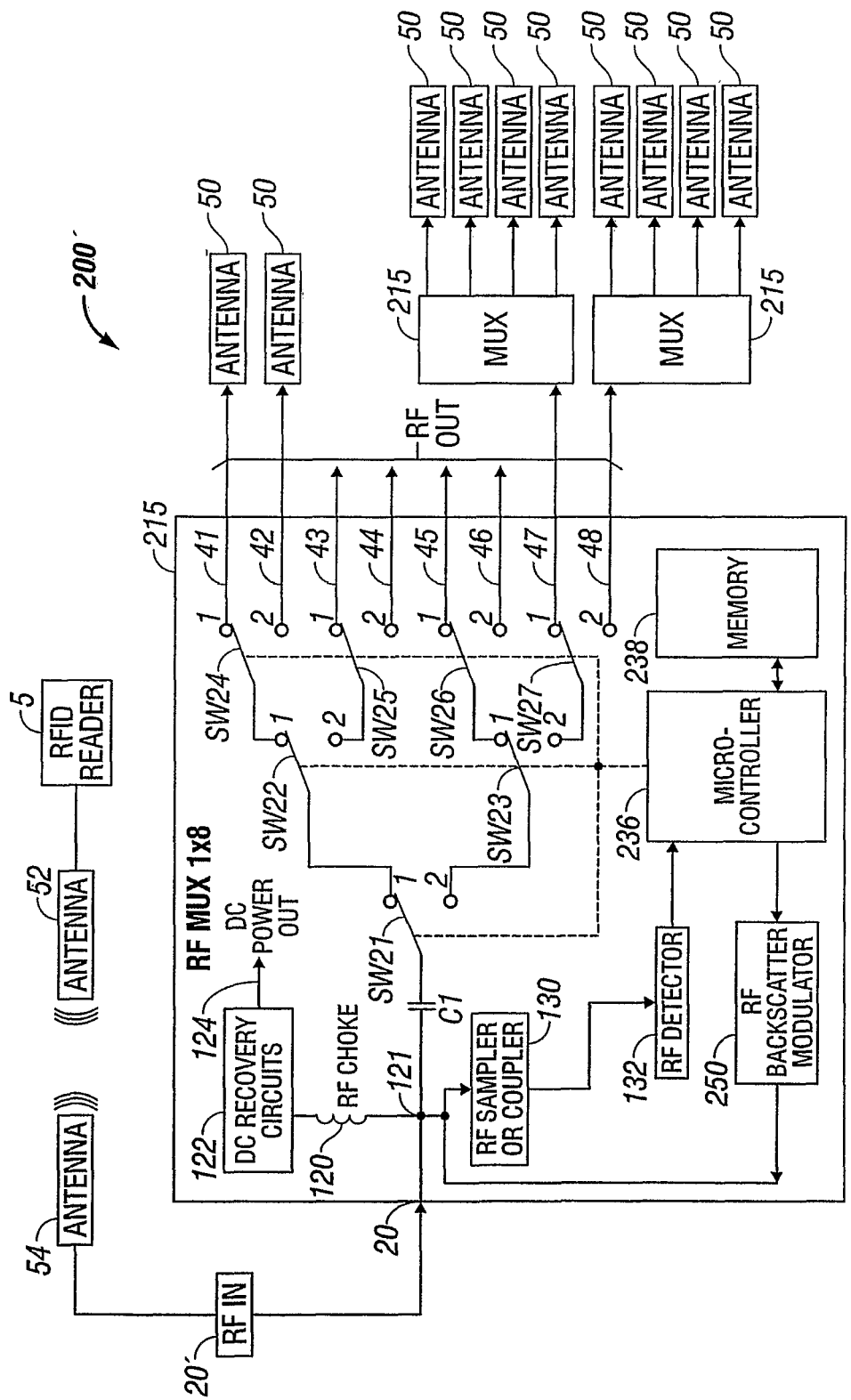
FIG. 5 is a schematic diagram of an alternate embodiment of the RFID network of FIG. 3 having an RFID multiplexer with a single cable input port and which provides both forward and reverse communication through the RFID network according to the present disclosure.

FIGS. 4 and 5 illustrate alternate embodiments of the RFID networks 100 and 200 of FIGS. 2 and 3, respectively. More particularly, RFID network 100' and RFID network 200' are identical to RFID network 100 and RFID network 200 except that the RFID reader 5 is now directly coupled to a first or RFID reader antenna 52 instead of to the single cable 20'. The RFID reader antenna 52 transmits RF signal to and receives RF signal from a second or MUX RF signal input antenna 54. The MUX RF signal input antenna 54 is now directly coupled to the single cable 20' and serves to provide the RF IN signal 20. Hence, the length of the single cable 20' may be shortened and substantial wireless communication may be established between the RFID reader 5 and the MUX 115 of RFID network 100' or the MUX 215 of RFID network 200'. Those skilled in the art will recognize that the distance between the RFID reader antenna 52 and the MUX RF IN antenna 54 may be limited by the available strength and coherence of the RF signal therebetween.

Figure 6:
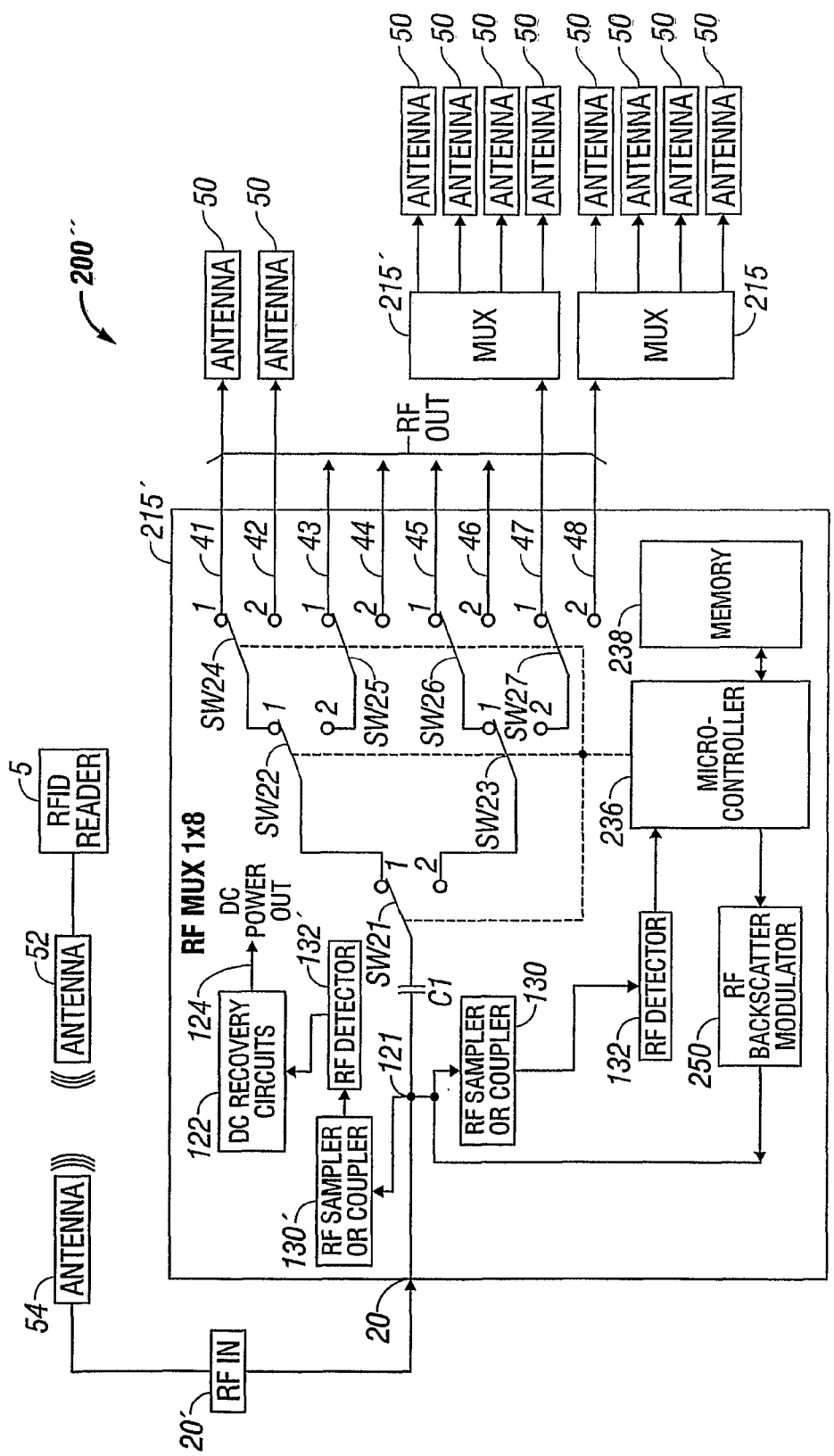
FIG. 6 is a schematic diagram of another alternate embodiment of the RFID network of FIG. 5 having an RFID multiplexer with a single cable input port and which provides both forward and reverse communication through the RFID network according to the present disclosure.

FIG. 6 illustrates still another alternate embodiment of the RFID networks 200 and 200' of FIGS. 3 and 5, respectively. More particularly, RFID network 200" is identical to RFID network 200' with the exception that network 200" includes RFID multiplexer 215' in which the RF choke 120 of RFID multiplexer 215 is now replaced by RF sampler or coupler 130' and RF detector 132' in a manner analogous to the manner in which RF sampler or coupler 130 and RF detector 132 are coupled to the microcontroller 236. Consequently, RF sampler or coupler 130' is operatively coupled to the coaxial cable 20' at junction point 121 and RF detector 132' is operatively coupled to the RF sampler 130. Therefore, the RF detector 132' also detects the RF signal from the coaxial cable 20' via the RF sampler 130'. However, the RF detector 132' is now operatively coupled to the DC power recovery circuits 122. As a result, a portion of the RF signal provided through the RF signal path 20' is now recovered by the RF sampler 130' and the RF detector 132', where the portion of the RF signal may be converted to DC by a diode (not shown) and supplied to the DC power recovery circuits 122 which again direct the recovered power as DC output power 124 to the MUX internal circuits (not shown).

Those skilled in the art will recognize that the RF choke 120 illustrated in FIGS. 2 and 4 for RFID multiplexer 115 may also be replaced by RF sampler or coupler 130' and RF detector 132' in the same manner to again supply the DC power recovery circuits 122 and direct the recovered power as output power 124.

The RF MUX networks 100, 100' and 200, 200', 200" and the corresponding MUX 115 and 215, 215" significantly reduce the amount of wiring needed to install the MUX in an RFID network since all control and power signals are sent on a single coaxial cable connected to the MUX along with the RF signals.

The addition of an RF back-scatter modulator allows the MUX to communicate back to the reader. The advantage of full communication in both the forward and reverse directions is that the network may automatically detect when a new MUX has been added and the reader may determine the status (or logic state) of each MUX. As a result, the construction and maintenance of a network of RFID antennas is significantly enhanced.

The advantage of the combination of RF signal, control, and power on a single coaxial cable for use in an RFID multiplexer to reduce the number of cables required to construct a network of RFID antennas using an RF multiplexer is further magnified by the ability of the RFID reader to communicate with all multiplexers via the RF path using the RFID protocol.

While certain features of the embodiments of the invention have been illustrated as described herein, many modifications, substitutions, changes and equivalents may occur to those skilled in the art. It is, therefore, to be understood that the appended claims are intended to cover all such modifications and changes as fall within the true scope and spirit of the embodiments of the invention.

What is claimed is:

1. A method for controlling a multiplexer in an RFID network for communicating with a plurality of RFID tags, comprising transmitting from an RFID reader one or more RFID tag interrogation signals, each consisting of an RF signal having a data format and modulation consistent with an RFID protocol for interrogating an RFID tag so as to obtain an RFID tag response, said RFID tag interrogation signals each including an RFID tag identification number to specify a particular RFID tag which is being interrogated;

storing an assigned RFID tag identification number which has been assigned to an RF multiplexer in a first data storage device of the RF multiplexer;

storing the assigned RFID tag identification number in a second data storage device of the RFID reader;

receiving the one or more RFID tag interrogation signals from the RFID reader at a multiplexer input port of the RF multiplexer, said RF multiplexer capable of selectively routing each said RF signal from said multiplexer input port to one of a plurality of multiplexer output ports through a switching network provided within the RF multiplexer;

detecting at the RF multiplexer the occurrence of at least one said RFID tag interrogation signal which comprises a multiplexer channel-change command by monitoring incoming RF signals received at the multiplexer input port, decoding one or more of said RFID tag interrogation signals which are received at the multiplexer input port to obtain RFID data contained in the RFID tag interrogation signal, including the RFID tag identification number, and based on said decoding, selectively identifying that said RFID tag interrogation signal constitutes a multiplexer channel change command; and responsive to said identifying, selectively using the RFID data contained within the RFID tag interrogation signal to control the switching network;

wherein the RFID reader uses the assigned RFID tag identification number to address a channel change command to the RF multiplexer, and uses the same signaling format as when communicating an RFID tag interrogation signal to an RFID tag.

2. The method according to claim 1 further comprising using control data comprising a portion of the RFID tag interrogation signal to selectively control an intended channel setting of the RF multiplexer specified by the RFID tag interrogation number.

3. The method according to claim 1, further comprising transmitting the RFID tag interrogation signals, including those RFID tag interrogation signals comprising said multiplexer channel change command, using an industry standard RFID protocol.

4. The method according to claim 1, further comprising determining the intended multiplexer channel setting at the RF multiplexer by decoding control data obtained from the RFID tag interrogation signal which has been identified as a multiplexer channel change command.

5. The method according to claim 1, further comprising obtaining from at least one signal applied to the multiplexer input port a DC voltage, and using the DC voltage as a primary power source for operation of the multiplexer.

6. The method according to claim 1, further comprising using the DC voltage to power an RF backscatter modulator provided in the multiplexer.

7. The method according to claim 1, wherein the multiplexer input port comprises a single port, and further comprising using that single port to receive a primary source of input power for powering the operations of the RF multiplexer, to receive control signals which control switching operations of the RF multiplexer, and to supply said RF signals which are to be routed to the plurality of multiplexer output ports.

8. An RFID network for communicating with a plurality of RFID tags, comprising:
   an RFID reader arranged to transmit one or more RFID tag interrogation signals, each consisting of an RF signal having a data format and modulation consistent with an RFID protocol for interrogating an RFID tag so as to obtain an RFID tag response, said RFID tag interrogation signals each including an RFID tag identification number to specify a particular RFID tag which is being interrogated;
   a first data storage device in the RF multiplexer in which is stored an assigned RFID tag identification number which has been assigned to an RF multiplexer;
   a second data storage device in the RFID reader in which is stored the assigned RFID tag identification number;
   the RF multiplexer coupled to the RFID reader, and receiving the one or more RFID tag interrogation signals from the RFID reader at a multiplexer input port, said RF multiplexer configured to facilitate routing of said RF signals from said multiplexer input port to one of a plurality of multiplexer output ports through a switching network provided within the RF multiplexer;
   at least one electronic circuit in the RF multiplexer which is arranged to detect the reception of at least on said RFID tag interrogation signal which comprises a multiplexer channel-change command by
   monitoring incoming RF signals received the multiplexer input port,
   decoding one or more of said RFID tag interrogation signals which are received at the multiplexer input port to obtain RFID data contained in the RFID tag interrogation signal, including the RFID tag identification number, and
   based on said decoding, selectively identifying that said RFID tag interrogation signal constitutes a multiplexer channel change command; and
   switch control circuitry responsive to said identifying of said multiplexer channel change command to selectively control the switching network in accordance with control data contained within the RFID tag interrogation signal;
   wherein the RFID reader uses the same signaling format for a channel change command as is used when communicating an RFID tag interrogation signal to an RFID tag, and uses the assigned RFID tag identification number to address the channel change command to the RF multiplexer.

9. The RFID network according to claim 8, wherein control data comprising a portion of the RFID tag interrogation signal specifies an intended channel setting of the RF multiplexer which has been identified by the RFID tag interrogation number.

10. The method according to claim 1, wherein the multiplexer input port comprises a single port, and wherein that single port receives a primary source of input power for powering the operations of the multiplexer, receives control signals which control switching operations of the multiplexer, and receives said RF signals which are to be routed to the plurality of multiplexer output ports.

* * * * *